United States Patent
Yin et al.

(10) Patent No.: US 12,010,405 B2
(45) Date of Patent: Jun. 11, 2024

(54) GENERATING VIDEO SUMMARY

(71) Applicant: International Business Machines Corporation, Armonk, NY (US)

(72) Inventors: Kun Yan Yin, Ningbo (CN); Lei Mei, Ningbo (CN); Yan Hu, Ningbo (CN); Yan Feng Han, Ningbo (CN); Qi Ruan, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 17/457,506

(22) Filed: Dec. 3, 2021

(65) Prior Publication Data
US 2023/0179839 A1 Jun. 8, 2023

(51) Int. Cl.
*H04N 21/8549* (2011.01)
*G06V 10/74* (2022.01)
*G06V 20/40* (2022.01)
*G11B 27/031* (2006.01)

(52) U.S. Cl.
CPC ....... *H04N 21/8549* (2013.01); *G06V 10/761* (2022.01); *G06V 20/41* (2022.01); *G06V 20/47* (2022.01); *G11B 27/031* (2013.01)

(58) Field of Classification Search
CPC ........... H04N 21/8549; H04N 21/4394; H04N 21/44224; H04N 21/4756; H04N 21/23418; G06V 10/761; G06V 20/41; G06V 20/47; G11B 27/031
USPC ......................................................... 386/278
See application file for complete search history.

(56) References Cited

U.S. PATENT DOCUMENTS

| | | | |
|---|---|---|---|
| 9,286,938 B1* | 3/2016 | Tseytlin | G11B 27/031 |
| 9,465,435 B1* | 10/2016 | Zhang | H04N 21/8549 |
| 9,792,502 B2 | 10/2017 | Newman | |
| 10,079,040 B2 | 9/2018 | Belliveau | |
| 10,541,000 B1* | 1/2020 | Karakotsios | H04N 21/25891 |
| 10,825,227 B2 | 11/2020 | Amer | |
| 2006/0251385 A1* | 11/2006 | Hwang | G06F 16/785 |
| | | | 386/214 |
| 2013/0041747 A1* | 2/2013 | Anderson | H04N 21/8133 |
| | | | 715/733 |
| 2017/0185235 A1* | 6/2017 | Barnett | G06F 16/438 |
| 2018/0210954 A1 | 7/2018 | Guegan | |
| 2019/0027188 A1* | 1/2019 | Akolkar | G06F 40/20 |
| 2019/0172493 A1 | 6/2019 | Khan | |
| 2020/0327432 A1 | 10/2020 | Doebelin | |

(Continued)

FOREIGN PATENT DOCUMENTS

CN 103210651 B2 7/2013

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

*Primary Examiner* — Loi H Tran
(74) *Attorney, Agent, or Firm* — Scott S. Dobson

(57) ABSTRACT

A computer-implemented method includes receiving a viewer request for playing a video summary of a video, wherein the viewer request includes a length of the video summary, generating the video summary of the viewer-requested length comprising a set of frames selected from the video based on audience reviews of the video, and playing a video stream of the video summary.

11 Claims, 9 Drawing Sheets

(56) References Cited

U.S. PATENT DOCUMENTS

2021/0390315 A1* 12/2021 Behrostaghi ......... G06V 40/172
2021/0407161 A1* 12/2021 Fukushima ......... G06F 3/04842

* cited by examiner

400

RECEIVE A VIEWER REQUEST FOR PLAYING A VIDEO SUMMARY OF A VIDEO OF A LENGTH
410

PLAY A VIDEO STREAM OF THE LENGTH AS THE VIDEO SUMMARY, THE VIDEO STREAM COMPRISING A SET OF FRAMES SELECTED FROM THE VIDEO BASED ON AUDIENCE REVIEWS ON THE VIDEO
420

FIG.4A

EXTRACT IMAGE FEATURES OF THE IMAGES TO GENERATE IMAGE FEATURE VECTORS, EACH OF THE IMAGE FEATURE VECTORS CORRESPONDING TO A RESPECTIVE ONE OF THE IMAGES
431

GROUP THE IMAGE FEATURE VECTORS INTO CLUSTERS, THE CLUSTERS BEING RANKED BASED ON THEIR SIZES AND EACH HAVING RESPECTIVE CENTER POINT IMAGE FEATURE VECTORS
432

DESIGNATE ONE OR MORE IMAGES CORRESPONDING RESPECTIVE CENTER POINT IMAGE FEATURE VECTORS OF ONE OR MORE TOP-RANKED CLUSTERS OF THE CLUSTERS AS THE ONE OR MORE REPRESENTATIVE IMAGES
433

DETERMINE THE WEIGHTS OF IMPORTANCE OF THE ONE OR MORE REPRESENTATIVE IMAGES AT LEAST BASED ON THE SIZES OF THE ONE OR MORE TOP-RANKED CLUSTERS
434

FIG.4C

COMPARE FRAMES OF THE VIDEO WITH THE ONE OR MORE REPRESENTATIVE IMAGES TO CALCULATE THEIR CONFIDENCE LEVELS OF SIMILARITY TO RESPECTIVE REPRESENTATIVE IMAGES
441

DETERMINE THE FRAMES THAT HAVE CONFIDENCE LEVELS GREATER THAN A THRESHOLD AS THE CANDIDATE FRAMES, WHEREIN THE CANDIDATE FRAMES ARE DIVIDED INTO TIERS EACH ASSOCIATED WITH RESPECTIVE REPRESENTATIVE IMAGES, THE TIERS BEING RANKED IN ORDER OF THE WEIGHTS OF IMPORTANCE OF THE THEIR ASSOCIATED REPRESENTATIVE IMAGES, AND WHEREIN THE CANDIDATE FRAMES ARE FURTHER RANKED IN ORDER OF THEIR CONFIDENCE OF SIMILARITY
442

FIG. 4D

GENERATING VIDEO SUMMARY

BACKGROUND

The present invention relates to video processing, and more specifically, to a method and system for generating video summaries.

With the rapid development of computer network and multimedia technologies, portal video websites became increasingly popular. The widespread use of mobile devices facilitates viewers to watch videos provided at the portal video websites almost anytime and anywhere. Different viewers may have different preferences for how a video is played. They may vary from time to time depending on specific circumstances. Many people like to use fragmented time to watch videos.

SUMMARY

According to one embodiment of the present disclosure, there is provided a computer-implemented method. The method includes receiving a viewer request for playing a video summary of a video, wherein the viewer request includes a length of the video summary, generating the video summary of the viewer-requested length comprising a set of frames selected from the video based on audience reviews of the video, and playing a video stream of the video summary.

According to another embodiment of the present disclosure, there is provided a computer system. The computer system comprises one or more processors, a memory coupled to the one or more processors; and a set of computer program instructions stored in the memory and executed by the one or more processors to implement a method. The method includes receiving a viewer request for playing a video summary of a video, wherein the viewer request includes a length of the video summary, generating the video summary of the viewer-requested length comprising a set of frames selected from the video based on audience reviews of the video, and playing a video stream of the video summary.

According to still another embodiment of the present disclosure, there is provided a computer program product. The computer program product comprises a computer readable storage medium having program instructions embodied therewith, wherein the program instructions are executable by one or more processors to implement a method. The method includes receiving a viewer request for playing a video summary of a video, wherein the viewer request includes a length of the video summary, generating the video summary of the viewer-requested length comprising a set of frames selected from the video based on audience reviews of the video, and playing a video stream of the video summary.

BRIEF DESCRIPTION OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure.

FIG. 4A depicts an overall process flow of a computer-implemented method according to embodiments of the present disclosure.

FIG. 4C depicts a process flow of a computer-implemented method according to embodiments of the present disclosure.

FIG. 4D depicts a process of statistical analysis according to embodiments of the present disclosure.

DETAILED DESCRIPTION

Figure 1:
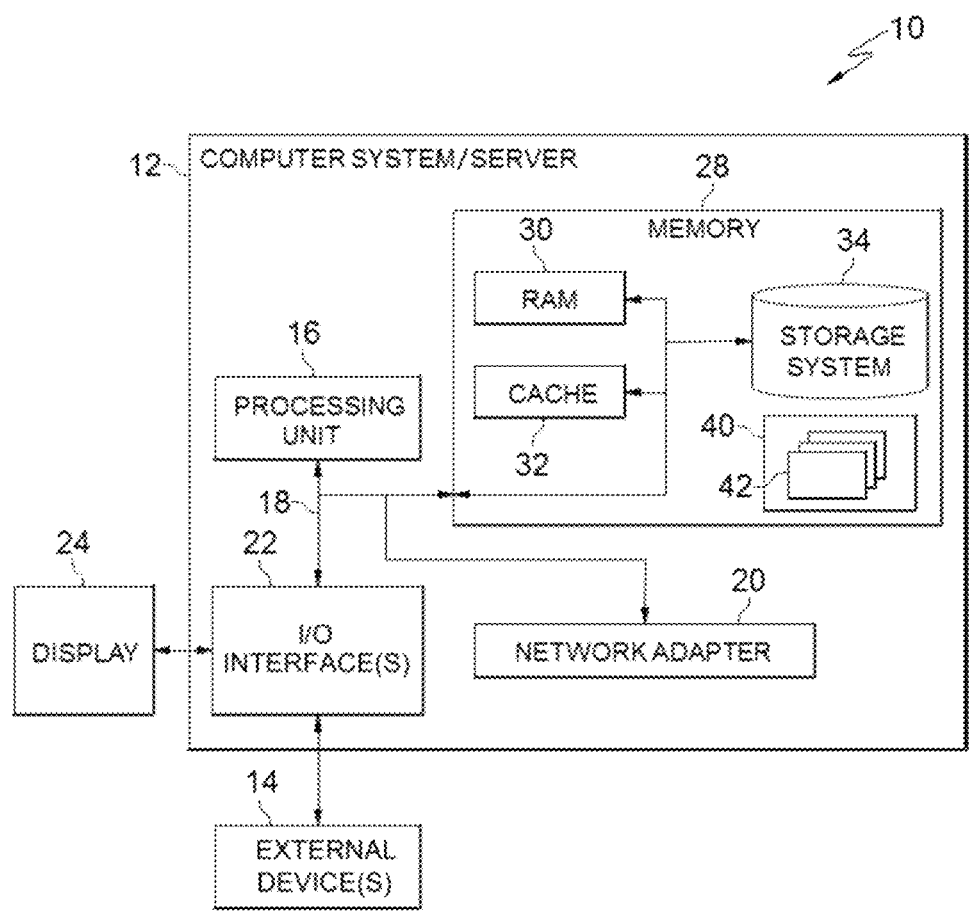
FIG. 1 depicts a cloud computing node according to embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
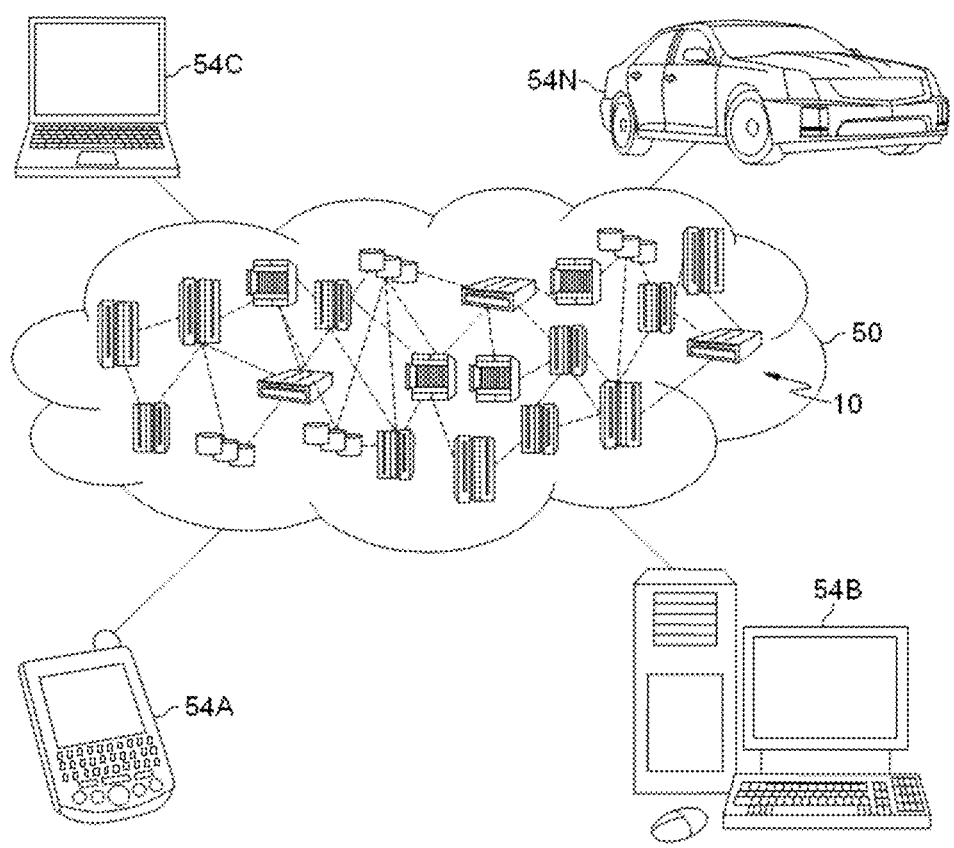
FIG. 2 depicts a cloud computing environment according to embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
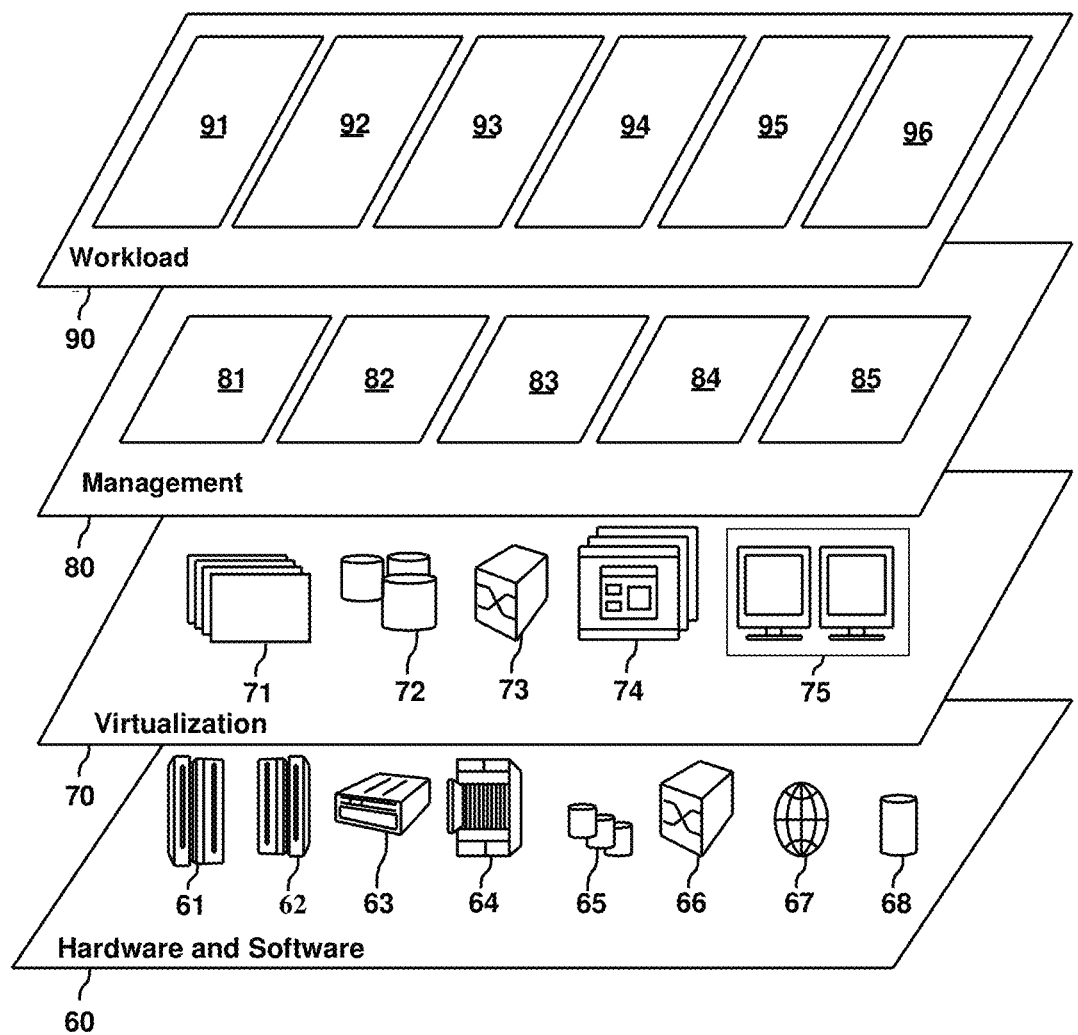
FIG. 3 depicts abstraction model layers according to embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating video summaries 96.

As noted above, with the rapid development of computer network multimedia technologies, there are increasing number of portal video websites provided by video content providers. The use of smart mobile devices enables viewers to watch videos almost anytime and anywhere. Different viewers may have different preferences for how a video is played depending on specific circumstances. A considerable number of people prefer to use fragmented time to watch videos. For example, a viewer A may wish to take ten minutes just to watch the hottest or most interesting scenes of a video while waiting to be served in a restaurant. Another viewer B may wish to spend only three minutes to watch highlights of a video while lining up to pay in a shopping mall.

There are portal video websites that provide short video summaries. Current methods typically provide such a video summary by firstly segmenting an original video into a set of different shots or scenes according to pre-defined criteria. The criteria may require that the each of the segmented shots represents an important scene and, as a whole, they portray a complete story of the video. Key video frames are extracted from the segmented shots and combined into a video stream as the video summary. In this way, the original video may be "condensed" into the video summary shorter in length, or duration of time. However, the content and the length of video summary are pre-defined and based only on the original video itself.

Such a video summary may not adequately meet different requirements of individual viewers. For example, for the viewer B, if the video summary is five minutes long, the viewer B can only view a part of it in their three minutes. However, for the viewer A, the video summary is too short.

It is observed that many portal video websites allow for user interactions with websites, including supporting viewers to post comments during or after viewing the videos. The comments may include images, textual messages, and/or combinations thereof. The images are typically derived from the videos. For example, the images are screenshots or pictures captured from the videos. In the context of the present disclosure, the comments are generally referred to as audience reviews. As may be understood, the audience reviews reflect interesting points in the content of the videos, such as interesting scenes and/or topics. Based on the observation, the present disclosure proposes a method, system, and computer program product to generate video summaries based on audience reviews, and the video summaries may be generated at the request of viewers in real time.

With reference to FIG. 4A to FIG. 7, embodiments of the disclosure will be described. Referring to FIG. 4A, an overall process flow of a computer-implemented method 400 is depicted according to some embodiments of the present disclosure. As shown, the method 400 generally comprises the following operations that may be performed by one or more processing units: receiving a viewer request for playing a video summary of a video of a length (block 410) and playing a video stream of the length as the video summary, the video stream comprising a set of frames selected from the video based on audience reviews on the video (block 420). The process of method 400 may be performed for a portal video website supported by a computer system, such as server 12 (FIG. 1), at a cloud computing node 10 (FIG. 2) for example.

Suppose a viewer is visiting the portal video website with a computing device, such as smart phone 54A (FIG. 2). The portal video website may provide a user interface that enables individual viewers to enter a request. The viewer may make a request, through a user interface provided by the portal video website, for playing a video summary of a video with the video summary having a viewer-specified length. In other words, the viewer is requesting the portal video website to play a video summary of interest within a specified length of time. At block 410, the viewer request may be received, for example, by the program modules 42 (FIG. 1) running on the server 12 at the computing node 10 (FIG. 1 and FIG. 2) that supports the portal video website. In response, at block 420, a video stream of the specified length may be played as the video summary requested. The video stream comprises a set of frames. The set of frames are selected from the video based on audience reviews on the video.

As will be appreciated from the detailed descriptions below, in one implementation, the video stream may be generated in response to the viewer request; and in another implementation, the video stream may be generated ahead of the particular viewer request.

Figure 4B:
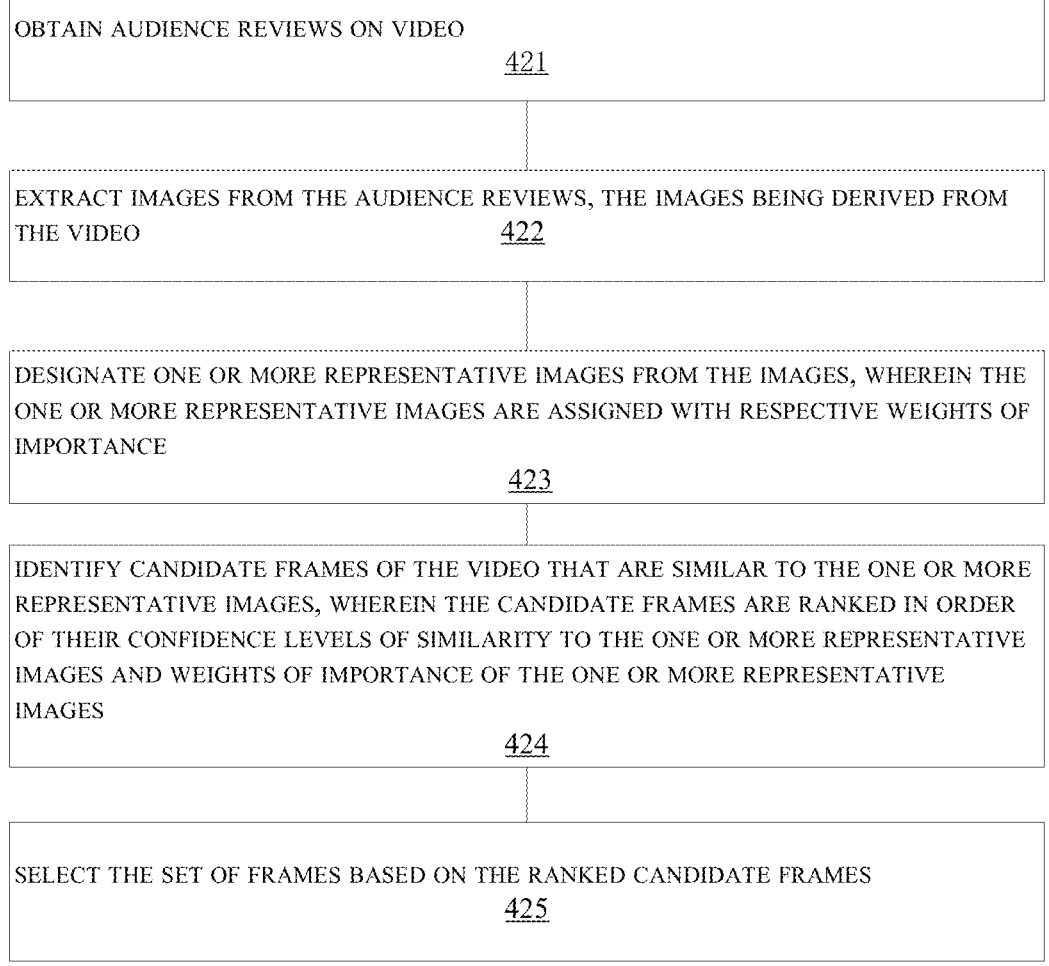
FIG. 4B depicts a process flow of a computer-implemented method according to embodiments of the present disclosure.

Turn to FIG. 4B, a process according to some embodiments of the present disclosure. Specifically, the process illustrates the generation of the video stream. As shown, the process generally comprises the following operations that may be performed by one or more processing units: obtain the audience reviews on the video (block 421); extracting images from the audience reviews, the images being derived from the video (block 422); designating one or more representative images from the images, wherein the one or more representative images are assigned with respective weights of importance (block 423); identifying candidate frames of the video that are similar to the one or more representative images, wherein the candidate frames are ranked in order of their confidence levels of similarity to the one or more representative images and weights of importance of the one or more representative images (block 424); selecting the set of frames based on the ranked candidate frames (block 425).

To generate the video stream, at block 421, the audience reviews on the video may be obtained. As noted above, viewers may post audience reviews to an interaction interface (not shown) of the portal video website during or after viewing videos. The audience reviews reflect interesting points of the videos, such as interesting scenes and/or topics. For a given video, there may be a huge amount of audience reviews from different viewers. According to embodiments of the disclosure, audience reviews may be gathered by server 12 (FIG. 1), and then processed, organized, and stored in a database (a.k.a. a "comment library") in storage system 34 (FIG. 1) for the implementation of the disclosure, among other arrangements. The audience reviews may be updated, taking into account of additional reviews posted over time. Thus, at block 421, the audience reviews may be fetched from the comment library by server 12.

The audience reviews may include images. The images may be derived from videos. For example, the images are snapshots captured from the videos. At block 422, the images may be extracted from the audience reviews.

At block 423, one or more representative images may be designated from the images extracted at block 422. The one or more representative images are assigned with respective weights of importance. In the context of the disclosure, a representative image is an image that may represent a group of similar images that correspond to "hottest", "awesome", and "best" video frames as they may be referred to in the audience reviews.

Figure 5:
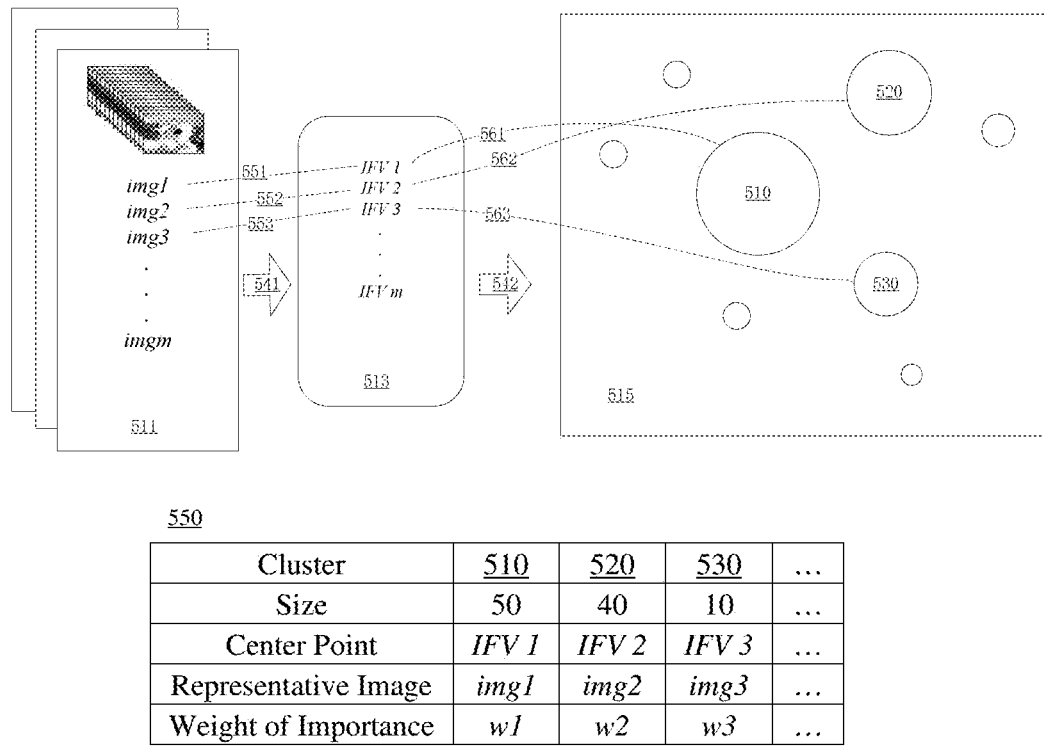
FIG. 5 is a diagram illustrating the process of FIG. 4D according to embodiments of present disclosure.

The one or more representative images may be identified by employing suitable statistical analysis techniques. FIG. 4C depicts a process of statistical analysis for designating representative images according to embodiments of the disclosure, and FIG. 5 is a diagram illustrating the process of FIG. 4C according to embodiments of the disclosure. As shown in FIG. 4C, the process generally comprises the following operations that may be performed by one or more processing units: extracting image features of the images to generate image feature vectors, each of the image feature vectors corresponding to a respective one of the images (block 431); grouping the image feature vectors into clusters, the clusters being ranked based on their sizes and each having respective center point image feature vectors (block 432); designating one or more images corresponding to respective center point image feature vectors of one or more top-ranked clusters of the clusters as the one or more representative images (block 433); and determining the weights of importance of the one or more representative images at least based on the sizes of the one or more top-ranked clusters (block 434).

FIG. 5 shows a collection of images img1, img2, img3, . . . , imgm. They are collectively referred to as Images 511. Hereinafter, Images 511 are used to represent the images extracted at block 422.

At block 431, image features of the Images 511 are extracted to generate image feature vectors. Each of the image feature vectors corresponds to a respective image of the Images 511. In one or more embodiments, the extraction of the image features may be accomplished by using a Convolutional Neural Networks (CNN) algorithm. CNN is an application of deep learning algorithm in the field of image processing, such as image recognition, facial recognition, gender/age/emotion recognition, object detection, scene judgment, etc. It is widely employed to extract image features. As indicated by an arrow 541, the image features may be extracted from Images 511 by using such a CNN algorithm, resulting in a set of image feature vectors (a.k.a. an "image feature space") IFV 1, IFV 2, IFV 3, . . . , IFV m. For example, the corresponding relationship of the images img1, img2, img3 and the image feature vectors IFV 1, IFV 2, IFV 3 are indicated by dotted lines 551, 552, 553. Hereinafter, the image feature vectors will be collectively referred to as Vectors 513, or simply as "vectors" where there is no confusion.

At block 432, the Vectors 513 may be grouped into clusters. According to an embodiment of the disclosure, the Vectors 513 may be grouped by using some suitable clustering algorithms. As is known, clustering is an unsupervised machine learning process that may automatically discover natural grouping in data. Clustering algorithms interpret input data and find natural groups or clusters in a feature space, such as an image feature space comprising the Vectors 513. As indicated by an arrow line 542, Vectors 513 may be clustered into clusters or groups according to their similarity. The result of the clustering is a set of clusters (a.k.a. a "cluster space") 510, 520, 530, and so on. The clusters are also collectively referred to as Clusters 515 hereinafter. Each of the Clusters 515 includes some of the Vectors 513 that share similar feature points. For each of the Clusters 515, there is a center point vector that has the least average distance with other vectors included in the cluster. In the example of FIG. 5, the center point vector of cluster 510 is IFV 1, IFV 2 is the center point vector of cluster 520, and IFV 3 is the center point vector of cluster 530, as indicated respectively by lines 561, 562, 563.

The Clusters 515 may be ranked based on, or in order of, their sizes. The size of a cluster is the number of image feature vectors included in the cluster. FIG. 5 shows an example Table 550. Table 5 comprises three top-ranked clusters 510, 520 and 530. Specifically, cluster 510 has a size of 50, cluster 520 has a size of 40, and cluster 530 has a size of 10. The clusters 510, 520 and 530 are ranked in descending order of their sizes. Table 550 also shows that the center point vector of clusters 510, 520, and 530 are IFV 1, IFV 2 and IFV 3, respectively.

At block 433, one or more images corresponding to respective center point image feature vectors of top-ranked one or more of the clusters may be designated as the one or more representative images.

As mentioned above, in the example, clusters 510, 520, and 530 are three top-ranked clusters in the Clusters 515. Their center point image feature vectors are IFV 1, and IFV 1, and IFV 1, respectively. Images img1, img2, and img3 corresponds to vectors IFV 1, IFV 2, and IFV 3, respectively. Thus, img1, img2, and img3 may be designated as representative images. The three representative images are shown in Table 550.

At block 434, weights of importance (a.k.a. "weights") w1, w2, and w3 of respective representative images img1, img2, and img3 are determined. The weights of importance may be determined at least based on the sizes of the top-ranked clusters 510, 520, and 530. For example, img1 may be assigned a weight of 50, which is the size of cluster 510 ranked the first. Similarly, Img2 may be assigned a weight of 40, and img3 may be assigned a weight of 10. The weights 50, 40 and 10 may be converted to normalized values 50%, 40% and 10%. Thus, the weights may be denoted as w1=50%, w2=40%, and w3=10%, w1>w2>w3.

It is understood that the more weight an image has, the more important the image is. Thus, image img1 (w1=50%) represents a group of the most interesting images in the audience reviews. Image img2 represents a group of the second most interesting images, and image img3 represents a group of the third most interesting images. It is to be noted that, in the example, three representative images are designated. However, greater or fewer representative images may be designated depending on implementations. In one implementation, only one representative image may be designated. In that case, the weight of importance of the representative image is simply 100%.

Back to FIG. 4B, after the one or more representative images are designated, then at block 424, candidate frames of the video are identified, wherein the candidate frames are ranked in order of their confidence levels of similarity to the one or more representative images and weights of importance of the one or more representative images.

With reference to FIG. 4D, implementing details of the operation at block 424 will be described. FIG. 4D depicts a process of statistical analysis according to embodiments of the disclosure. The process generally comprises the following operations that may be performed by one or more processing units: comparing frames of the video with the one or more representative images to calculate their confidence levels of similarity to respective representative images (block 441); determining the frames that have confidence levels greater than a threshold as the candidate frames, wherein the candidate frames are divided into tiers each associated with respective representative images, the tiers being ranked in order of the weights of importance of their associated representative images, and wherein the candidate frames are further ranked in order of their confidence levels of similarity (block 442).

Specifically, at block 441, frames of the video (a.k.a. "video frames" or "frames") are compared with the representative images to calculate their confidence levels of similarity to respective representative images. This may be performed by using any suitable known techniques or algorithms for comparing electric images, with the video frames being treated as images.

For example, the video frames may be compared with the representative image img1. Each video frame is scored according to its degree of similarity with the representative image img1. The score measures the video frame's confidence level of similarity to the representative image img1.

Frames with high confidence levels of similarity are regarded as candidate frames. To filter out low similar frames, a similarity confidence threshold, thres, may be defined, so that a confidence level is deemed as high confidence level only if it is greater than the threshold thres. For example, if confidence levels are ranged from 0 to 1, then the threshold thres might be set to a value of 0.5, or thres=0.5. Thus, at block 442, the frames that have confidence levels greater than 0.5 may be determined as candidate frames. In practical implementations, the threshold thres may be tuned to other values greater than 0.5.

Figure 6:
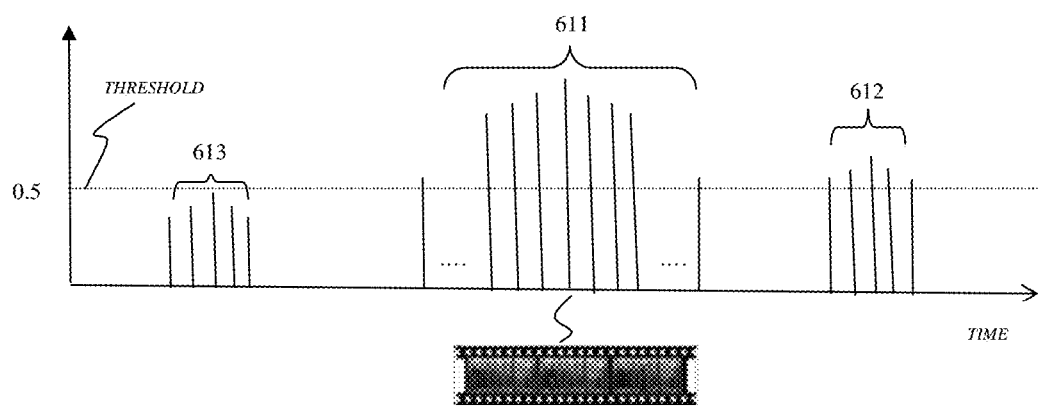
FIG. 6 illustrates video frames selected according to embodiments of the present disclosure.

Now turn to FIG. 6, depicted is a diagram illustrating example candidate frames according to an embodiment of the disclosure. In FIG. 6, a horizontal axis "TIME" represents points of time of the frames in the video, and a vertical axis "SIMILARITY CONFIDENCE" represents similarity confidence of video frames with respect to a representative image, for example, img1. FIG. 6 also shows a dotted horizontal line marking a threshold of thres=0.5 of the similarity confidence.

FIG. 6 shows three series of vertical lines 611, 612, and 613, each of the lines representing a frame at a point of time in the video. The height of the line represents the frame's score of similarity to the representative image img1. The similarity confidence scores of a first series of frames 611 are greater than the threshold 0.5. The similarity confidence scores of a second series of frames 612 are also greater than 0.5. Therefore, frames 611 and the frames 612 are determined to be candidate frames. In contrast, the similarity confidence scores of a third series of frames 613 are less than 0.5; therefore, frames 613 shall not be deemed as candidate frames.

Formally, a candidate frame $f_x$ may be denoted as $f_x$(img, s), wherein x represents a frame, img represents a representative image to which the frame x is similar, and s represents a similarity confidence as discussed above.

Accordingly, with respect to the representative image img1, frames 611 and frames 612 as determined at block 442 may denoted as a first set $S_1$ of candidate frames as the following:

$$S_1 = f_{1001}(img1, s1), f_{1002}(img1, s2), f_{1003}(img1, s3), \quad (1)$$

The candidate frames in the set $S_1$ may be ranked in order of their confidence levels of similarity to the representative image img1.

In a similar manner, a second set $S_2$ of candidate frames may be determined with respect to the representative image img2, and the candidate frames in the set $S_2$ are ranked in order of their confidence levels of similarity to img2. A third set $S_3$ of candidate frames may be determined with respect to the representative image img3. The candidate frames in the set $S_3$ are ranked in order of their confidence levels of similarity to img3. For the three example representative images, a complete set $S_C$ of candidate frames includes $S_1$, $S_2$ and $S_3$, namely, $S_C = S_1 + S_2 + S_3$.

It may be seen that in the process above, the candidate frames of the complete set $S_C$ are divided into three tiers, namely $S_1$ as the first tier, $S_2$ as the second tier and $S_3$ as the third tier. Because representative images img1, img2, and img3 are ranked in order of the weights of importance w1, w2, and w3, and $S_1$, $S_2$, and $S_3$ are each associated with respective img1, img2, and img3, the three tiers $S_1$, $S_2$, and $S_3$ may also be ranked in order of w1, w2, and w3.

Embodiments of the operation for identifying candidate frames of the video based on audience reviews have been described above. Back to FIG. 4B, at block 425, a set $S_F$ of frames may be selected on the basis of the ranked candidate frames for generating a video stream of a length. The set $S_F$ of frames may be selected based on the ranked candidate frames in various ways.

Assume that the length is specified to be t (in minutes) and the video stream would be played at a speed of 24 frames per second. Then $S_F$ would include n frames, n=t*60*24. In the following description, the n frames will also be referred to as "composing frames" in order to distinguish them from the candidate frames.

Assume there have been identified a complete set $S_C$ of candidate frames, $S_C = S_1 + S_2 + S_3$, as described above. According to an embodiment of the disclosure, the composing frames may be selected from $S_C$.

According to an embodiment of the disclosure, the selection may be performed first in order of the weights of importance of the candidate frames and then in order of the confidence levels of similarity. In other words, composing frames may be first selected from candidate frames belonging to the first tier S1, then from the candidate frames belonging to the second tier $S_2$, and then from the candidate frames belonging to the third tier $S_3$, and so on. Within each of the tiers, the composing frames are selected from candidate frames in order of the confidence levels of similarity.

Starting from the first tier $S_1$, candidate frames in $S_1$ are selected as composing frames in order of the confidence levels of similarity. Typically, candidate frames are sequences of frames adjacent to each other, like frames 611 as illustrated in FIG. 6. Thus, the composing frames may be one or more such sequences. If the number of the composing frames selected has amounted to n, the selection process may be ended. If all candidate frames in $S_1$ are selected and the number of the composing frames is less than n, then the same operation is repeated with respect to next ordered tier, which is $S_2$ in the example. The above operation may be iterated in the same manner with respect to remaining tiers, until n is reached. In this way, n composing frames, namely, the set $S_F$ of frames, may be selected.

Alternatively, according to an embodiment of the disclosure, the selection may be performed in order of the confidence levels of similarity, without considering the order of the weights of importance. For example, a first number of n1 frames are selected from the candidate frames in the first tier $S_1$, a first number of n2 frames are selected from the candidate frames in the second tier $S_2$, and a third number of n3 frames are selected from the third tier $S_3$, and so on, until the sum of n1, n2, and n3 has amounted to n, namely n1+n2+n3=n. Then the selection process may be ended. In this way, n composing frames, namely, the set $S_F$ of frames, may also be selected.

According to an embodiment of the disclosure, if a sequence of candidate frames is selected as the composing frames, one or more frames adjacent to the sequence may also be selected together with the sequence as the composing frames. For example, a sequence A of candidate frames in the first ranked tier $S_1$, such as frames 611, is selected. If sequence A ranges from a first point of time t1 to a second point of time t2, then a sequence A1 of frames preceding A and/or a sequence A2 of frames following A may also be selected. Sequence A1 includes frames ranging from (t1−Δt) to t1, and sequence A2 includes frames ranging from t2 to (t2+Δt) following A. Δt is a time period of several seconds, for example, and is tunable. A1 and/or A2 may be treated the same way as candidate frames. Therefore, if sequence A is qualified for selection, then A1+A or A1+A+A2 or A+A2 may be selected as the composing frames. In this way, n composing frames, namely, the set $S_F$ of frames, may be selected. The set $S_F$ may include some frames neighboring to candidate frames, even though the frames themselves are not candidate frames. An advantage of the implementation is that, with the addition of A1 and A2, the A-related part of scenes will be enriched and enhanced in the resulted video stream.

After the set $S_F$ of frames are selected, a video stream of the specified length, t, may be generated. The generated video stream will be used as the video summary. In practice, this may be accomplished with a video editor module (not shown) configured to edit video clips and video frames. The video editor module may be deployed in server 54B (FIG. 2) as part of or in support of the functionality of a portal video website. As the function and operation of a video editor module are well known in the prior art, its details may be omitted herein so as not to obscure the understanding of the focus of the disclosure.

Embodiments of the operations for generating a video summary of a specified length based on images in audience reviews on a given video have been described above. The operations may be performed for any one of the videos available at a portal video site based on audience reviews accumulated over time. And the operations may be performed at request in real time. According to an embodiment of the disclosure, in response to receiving a request of a viewer for playing a video summary of a video within a specified length, a video stream of the specified length may be generated as the video summary in the manner described above. Then the video stream may be played for the viewer.

It may be appreciated that, in the embodiments described above, the weights of importance of the representative images can be determined solely according to the images in the audience reviews. In other words, the weighting factor of the selected video frames can be image-based.

Figure 4E:
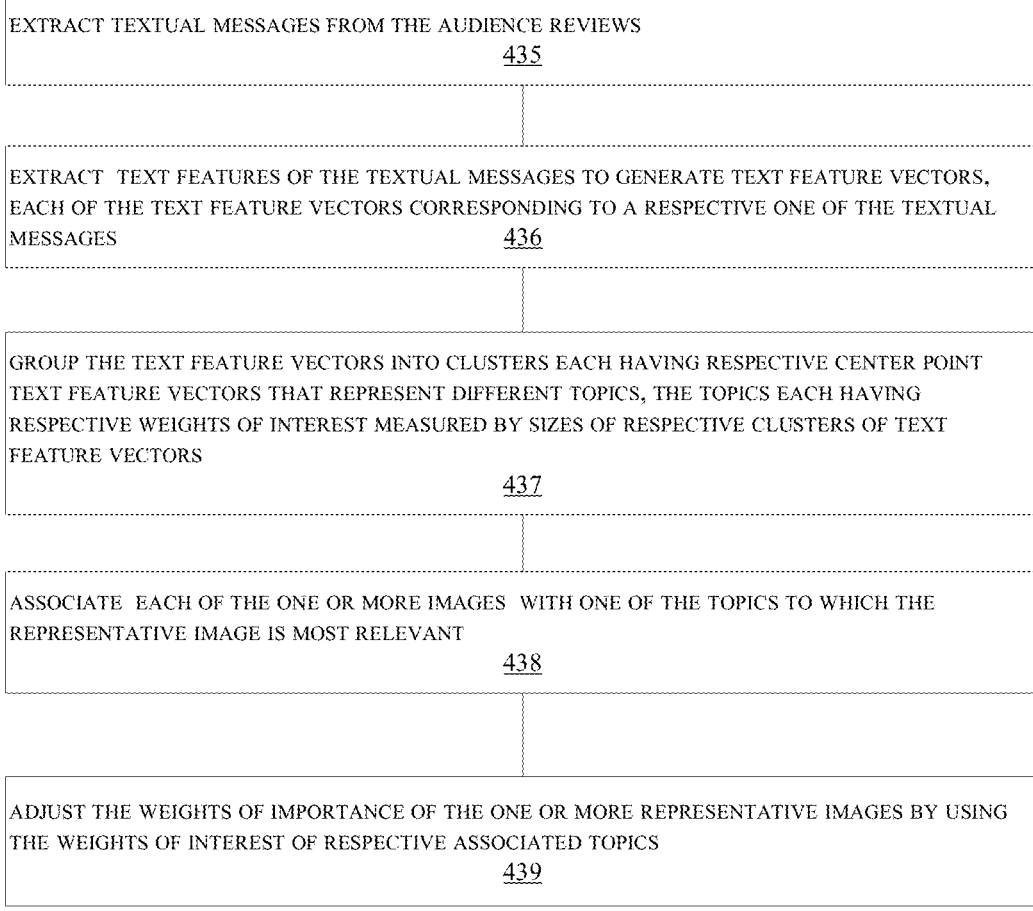
FIG. 4E depicts a process of statistical analysis according to embodiments of present disclosure.

According to an embodiment of the disclosure, an enhancement over image-based frame ranking such as noted above could be achieved by further taking account of textual messages in the audience reviews. FIG. 4E depicts a process of statistical analysis for adjusting the weights of importance of representative images according to an embodiment of the disclosure. The process generally comprises the following operations that may be performed by one or more processing units: extracting textual messages from the audience reviews (block 435); extracting text features of the textual messages to generate text feature vectors, each of the text feature vectors corresponding to a respective one of the textual messages (block 436); grouping the text feature vectors into clusters each having respective center point text feature vectors that represent different topics, the topics each having respective weights of interest measured by sizes of respective clusters of text feature vectors (block 437); associating each of the one or more images with one of the topics to which the representative image is most relevant (block 438); and adjusting the weights of importance of the one or more representative images by using the weights of interest of respective associated topics (block 439).

Figure 7:
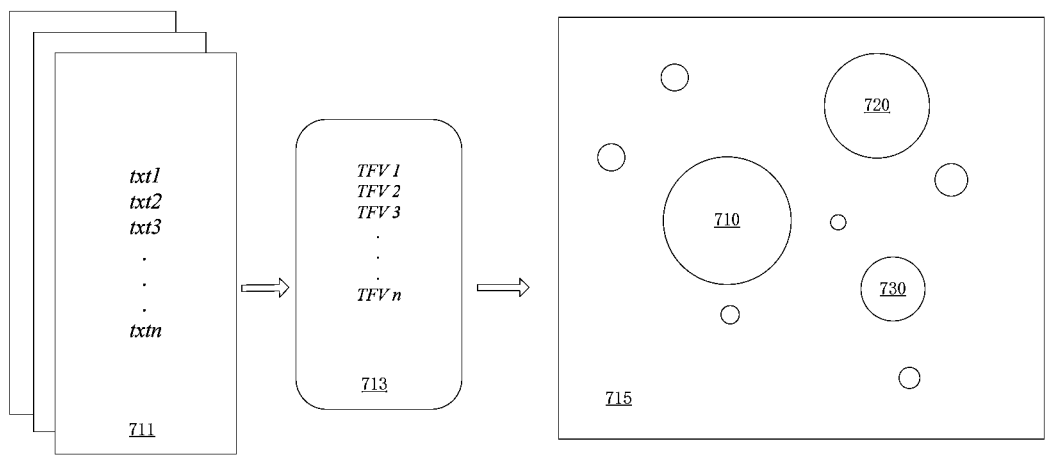
FIG. 7 is a diagram illustrating the process of FIG. 4E according to embodiments of present disclosure.

Embodiments of the operations will be described below with reference to FIG. 7, a diagram illustrating the process of FIG. 4E. As discussed above, the audience reviews may include textual messages that may be either independent of or in association with images. At block 435, the textual messages may be extracted from the audience reviews. The textual messages are depicted as a collection of textual messages txt1, txt2, txt3, . . . , txtn, collectively referred to as Texts 711.

At block 436, text features may be extracted from the Texts 711 to generate text feature vectors, each of the text feature vectors corresponding to a respective one of the textual messages. In one or more embodiments, the extraction of the text features may be accomplished by using a Long Short-Term Memory (LSTM) algorithm. As is known, LSTM is a kind of Recurrent Neural Networks (RNN) commonly employed in natural language analysis. In this example, the text features of the Texts 711 may be extracted by using such a LSTM algorithm, resulting in a set of text feature vectors include TFV 1, TFV 2, TFV 3, . . . , TFV n that respectively correspond to textual messages txt1, txt2, txt3, . . . , txtn. The set of text feature vectors are collectively referred to as Vectors 713.

At block 437, Vectors 713 may be grouped into clusters, for example, by using a suitable clustering algorithm. The result of the clustering is a set of clusters 710, 720, 730, and so on, collectively referred to as Clusters 715. The Clusters 715 have respective center point text feature vectors that represent different interesting topics. The topics each have respective weights of interest measured by sizes of respective clusters. For example, clusters 710, 720, and 730 have respective center point text feature vectors TFV 1, TFV 2, and TFV 3 that represent three interesting topics, topic1, topic2, and topic3. This is illustrated in a Table 750 in FIG. 7, which shows three topics topic 1, topic 2, and topic 3 represented by center point text feature vectors TFV 1, TFV 2, and TFV 3, respectively. The three topics each have respective weights of interest, u1, u2, and u3, measured by sizes of respective clusters 710, 720 and 730. This is illustrated in Table 750.

As shown in Table 750, the sizes of cluster 710, cluster 720, and 730 are 90, 80, and 30, respectively. Therefore, the weights of interest u1, u2, and u3 may simply be 90, 80, and 30, respectively. The values may be normalized to 45%, 40% and 15%; in other words, u1=45%, u2=40%, and u3=15%.

Then, at block 438, each of the one or more images is associated with one of the topics to which the representative image is most relevant. For example, the topics topic1, topic2, and topic3 are about "cat", "dog", and "elephant", respectively. The representative images img1, img2, and img3 respectively relate to "elephant", "dog" and "cat", as may be derived from their captions, for example. Then, img1, img2, and img3 may be associated with topic1, topic2, and topic3 respectively. The association relationship may be denoted as <img1, topic3>, <img2, topic2>, and <img3, topic1>.

At block 439, the weights of importance of the one or more representative images may be adjusted by using the weights of interest of respective associated topics. According to the association relationship <img1, topic3>, <img2, topic2>, and <img3, topic1>, the weight of importance w1 of the representative image img1 may be adjusted by using the weight of interest u3 of the topic topic3, the weight of importance w2 of the representative image img2 may be adjusted by using the weight of interest u2 of the topic topic2, and the weight of importance w3 of the representative image img3 may be adjusted by using the weight of interest u1 of the topic topic1.

Different rules may be defined in advance for the adjustment. For example, a first rule might be expressed as w'=w*u, then
  w'1=w1*u3=50%*15%=7.5%;
  w'2=w2*u2=40%*40%=16%; and
  w'3=w3*u1=10%*45%=4.5%, where w'1, w'2, and w'3 represent adjusted weights of importance of img1, img2, and img3 respectively.

The values of the adjusted may be normalized values, although it is not necessary. As can be understood, because w'2>w'1>w'3, the ranking of the three representative images is in order of img2, img1, img3, which is different with the order of img1, img2, img3 when w1>w2>w3 without the adjustment.

A second rule might be expressed as w'=w+u*30%, then
  w'1=w1+u3=50%+15%*30%=54.5%;
  w'2=w2+u2=40%+40%*30%=52%; and
  w'3=w3+u1=10%+45%*30%=23.5%.

According to the second rule, w'1>w'2>w'3, so the ranking of the three representative images is in order of img2, img1, img3, which is the same as the order of img1, img2, img3 when w1>w2>w3 without the adjustment.

From the embodiments described above, it may be appreciated that the weights of importance of the representative images may be flexibly determined based on the images as well as the textual messages found in the audience reviews so as to select suitable video frames for composing the video stream as the video summary.

Embodiments of the processing for generating a video summary of a video according to the disclosure have been described with respect to a single video. It shall be understood that the operations may be performed for other videos in a similar manner.

In one or more implementations, the video summaries may be generated (e.g., on a daily basis in the background) absent any viewer request, and stored in a video summary library (not shown) maintained in storage 34 (FIG. 1). The video summaries may be used to respond to viewer requests made shortly after the video summaries are generated. For example, a five-minute long video summary can be generated and stored in advance, whether at request or not. If a viewer later makes a request for playing a video summary of the video in five minutes, then the video summary may be retrieved and played for the viewer. An advantage of this is that computing resources may be saved by not having to repeatedly generate duplicate video summaries for virtually same viewer requests from different viewers in a very short time.

It should be noted that the processing of generating video summary at request in real time according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by one or more processing units, a viewer request for playing a video summary of a video, wherein the viewer request includes a length of the video summary; and
    in response to receiving the viewer request:
        obtaining, by one or more processing units, audience reviews on the video; extracting images from the audience reviews, the images being derived from the video;
        extracting, by one or more processing units, images features of the images to generate image feature vectors, each of the image feature vectors corresponding to a respective one of the images;
        grouping, by one or more processing units, the image feature vectors into clusters, the clusters being ranked based on their sizes and each having respective center point image feature vectors;
        designating, by one or more processing units, one or more images corresponding to respective center point image feature vectors of one or more top-ranked clusters of the clusters as the one or more representative images;
        determining, by one or more processing units, weights of importance of the one or more representative images based on the sizes of the one or more top-ranked clusters;
        extracting, by one or more processing units, textual messages from the audience reviews;
        extracting, by one or more processing units, text features of the textual messages to generate text feature vectors, each of the text feature vectors corresponding to a respective one of the textual messages;
        grouping, by one or more processing units, the text feature vectors into clusters each having respective center point text feature vectors that represent different topics, the topics each having respective weights of interest measured by sizes of respective clusters of the text feature vectors;
        associating, by one or more processing units, each of the one or more images with one of the topics to which the representative image is most relevant;
        adjusting, by one or more processing units, the weights of importance of the one or more representative images by using the weights of interest of respective associated topics;
        identifying, by one or more processing units, candidate frames of the video that are similar to the one or more representative images, wherein the candidate frames are ranked in order of their confidence levels of similarity to the one or more representative images and weights of importance of the one or more representative images;
        selecting, by one or more processing units, the set of frames based on the ranked candidate frames;
        generating, by one or more processing units, the video summary of the viewer-requested length comprising the set of frames; and
        playing, by one or more processing units, a video stream of the video summary.

2. The method of claim 1, further comprising:
    generating, by one or more processing units, the video stream in response to receiving the viewer request;
    wherein the set of frames selected is based solely on audience reviews of the video.

3. The method of claim 1, wherein the identifying candidate frames of the video comprises:
    comparing, by one or more processing units, frames of the video with the one or more representative images to calculate their confidence levels of similarity to respective representative images; and
    determining, by one or more processing units, the frames that have confidence levels greater than a threshold as the candidate frames, wherein the candidate frames are divided into tiers each associated with respective representative images, the tiers being ranked in order of the weights of importance of their associated representative images, and wherein the candidate frames are further ranked in order of their confidence levels of similarity.

4. The method of claim 3, wherein the identifying candidate frames of the video comprises:
    determining, by one or more processing units, frames that are adjacent to the candidate frames by an amount of time, wherein the frames have confidence levels lesser than the threshold; and including the frames as candidate frames.

5. A system comprising:
    one or more processors;
    a memory coupled to the one or more processors; and
    a set of computer program instructions stored in the memory and executed by the one or more processors to implement a method comprising:
        receiving a viewer request for playing a video summary of a video, wherein the viewer request includes a length of the video summary; and
        in response to receiving the viewer request:
            obtaining the audience reviews on the video;
            extracting images from the audience reviews, the images being derived from the video;
            extracting image features of the images to generate image feature vectors, each of the image feature vectors corresponding to a respective one of the images;

grouping the image feature vectors into clusters, the clusters being ranked based on their sizes and each having respective center point image feature vectors;

designating one or more images corresponding to respective center point image feature vectors of one or more top-ranked clusters of the clusters as the one or more representative images;

determining weights of importance of the one or more representative images based on the sizes of the one or more top-ranked clusters;

extracting textual messages from the audience reviews;

extracting text features of the textual messages to generate text feature vectors, each of the text feature vectors corresponding to a respective one of the textual messages;

grouping the text feature vectors into clusters each having respective center point text feature vectors that represent different topics, the topics each having respective weights of interest measured by sizes of respective clusters of the text feature vectors;

associating each of the one or more images with one of the topics to which the representative image is most relevant;

adjusting the weights of importance of the one or more representative images by using the weights of interest of respective associated topics;

identifying candidate frames of the video that are similar to the one or more representative images, wherein the candidate frames are ranked in order of their confidence levels of similarity to the one or more representative images and weights of importance of the one or more representative images;

selecting the set of frames based on the ranked candidate frames;

generating the video summary of the viewer-requested length comprising the set of frames; and playing a video stream of the video summary.

6. The system of claim 5, the method further comprising:
generating, by one or more processing units, the video stream in response to receiving the viewer request;
wherein the set of frames selected is based solely on audience reviews of the video.

7. The system of claim 5, wherein the identifying candidate frames of the video comprises:
comparing frames of the video with the one or more representative images to calculate their confidence levels of similarity to respective representative images; and
determining the frames that have confidence levels greater than a threshold as the candidate frames, wherein the candidate frames are divided into tiers each associated with respective representative images, the tiers being ranked in order of the weights of importance of their associated representative images, and wherein the candidate frames are further ranked in order of their confidence levels of similarity.

8. The system of claim 7, wherein the identifying candidate frames of the video comprises:
determining, by one or more processing units, frames that are adjacent to the candidate frames by an amount of time, wherein the frames have confidence levels lesser than the threshold; and
including the frames as candidate frames.

9. A computer program product, wherein the computer program product comprises a computer readable storage medium having program instructions embodied therewith, wherein the program instructions are executable by one or more processors to implement a method comprising:
receiving a viewer request for playing a video summary of a video, wherein the viewer request includes a length of the video summary; and
in response to receiving the viewer request:
obtaining, by one or more processing units, the audience reviews on the video;
extracting, by one or more processing units, images from the audience reviews, the images being derived from the video;
extracting, by one or more processing units, image features of the images to generate image feature vectors, each of the image feature vectors corresponding to a respective one of the images;
grouping, by one or more processing units, the image feature vectors into clusters, the clusters being ranked based on their sizes and each having respective center point image feature vectors;
designating, by one or more processing units, one or more images corresponding to respective center point image feature vectors of one or more top-ranked clusters of the clusters as the one or more representative images;
determining, by one or more processing units, weights of importance of the one or more representative images based on the sizes of the one or more top-ranked clusters;
extracting, by one or more processing units, textual messages from the audience reviews;
extracting, by one or more processing units, text features of the textual messages to generate text feature vectors, each of the text feature vectors corresponding to a respective one of the textual messages;
grouping, by one or more processing units, the text feature vectors into clusters each having respective center point text feature vectors that represent different topics, the topics each having respective weights of interest measured by sizes of respective clusters of the text feature vectors;
associating, by one or more processing units, each of the one or more images with one of the topics to which the representative image is most relevant;
adjusting, by one or more processing units, the weights of importance of the one or more representative images by using the weights of interest of respective associated topics;
identifying, by one or more processing units, candidate frames of the video that are similar to the one or more representative images, wherein the candidate frames are ranked in order of their confidence levels of similarity to the one or more representative images and weights of importance of the one or more representative images;
selecting, by one or more processing units, the set of frames based on the ranked candidate frames;
generating, by one or more processing units, the video summary of the viewer-requested length comprising the set of frames; and
playing a video stream of the video summary.

10. The computer program product of claim 9, the method further comprising:
generating, by one or more processing units, the video stream in response to receiving the viewer request;

wherein the set of frames selected is based solely on audience reviews of the video.

11. The computer program product of claim 9, wherein the identifying candidate frames of the video comprises:

comparing frames of the video with the one or more representative images to calculate their confidence levels of similarity to respective representative images; and determining the frames that have confidence levels greater than a threshold as the candidate frames, wherein the candidate frames are divided into tiers each associated with respective representative images, the tiers being ranked in order of the weights of importance of their associated representative images, and wherein the candidate frames are further ranked in order of their confidence levels of similarity.

\* \* \* \* \*